July 1, 1930.  J. A. HEANY  1,769,782

AIR SPRING SHOCK ABSORBER

Original Filed July 25, 1921

Inventor
JOHN ALLEN HEANY
By his Attorney
Chester H. Braselton

Patented July 1, 1930

1,769,782

UNITED STATES PATENT OFFICE

JOHN ALLEN HEANY, OF NEW HAVEN, CONNECTICUT, ASSIGNOR TO HEANY LABORATORIES INC., OF NEW HAVEN, CONNECTICUT, A CORPORATION OF CONNECTICUT

AIR-SPRING SHOCK ABSORBER

Application filed July 25, 1921, Serial No. 487,491. Renewed August 6, 1925.

The present invention relates to an air spring or pneumatic shock absorber and more particularly to a shock absorber for use in connection with the ordinary spring suspension of a vehicle for taking up sudden shocks transmitted through the wheels and axle of the vehicle.

Shock absorbers are commonly applied or inserted between the axle or axle housing of a vehicle and the spring mechanism. In the common types of shock absorber the jars and shocks of the wheel and axle are received by a spring or other resilient element in which the shock is deadened and from which a slower and less violent movement is transmitted to the vehicle body. Through this arrangement the spring mechanism and parts are protected from excessive strain and a much smoother motion of the chassis or body of the vehicle is obtained. In the ordinary types of shock absorbers difficulty has been encountered in receiving and deadening both the direct and rebound shocks received from the axle or axle housing, with a simplified practical apparatus.

An object of the present invention is to provide a shock absorber of simple construction in which the rebounds as well as the direct shocks are absorbed.

Another object of the invention is to provide such a shock absorber in which the compressibility of air or a gas confined in a pneumatic cushion, such as a rubber tube or container, may be utilized for absorbing shocks and rebounds, there being a special cooperation between the cooperative members, and the construction, relative location and coaction therebetween.

A further object of the invention is to provide a shock absorber which may be easily installed in the ordinary types of spring suspension and in which the elasticity of the shock absorbing element may be readily adjusted to various load conditions.

With these and other objects in view, as will appear from the following specification, the invention comprises the shock absorber described in the following specification.

Figure 1:
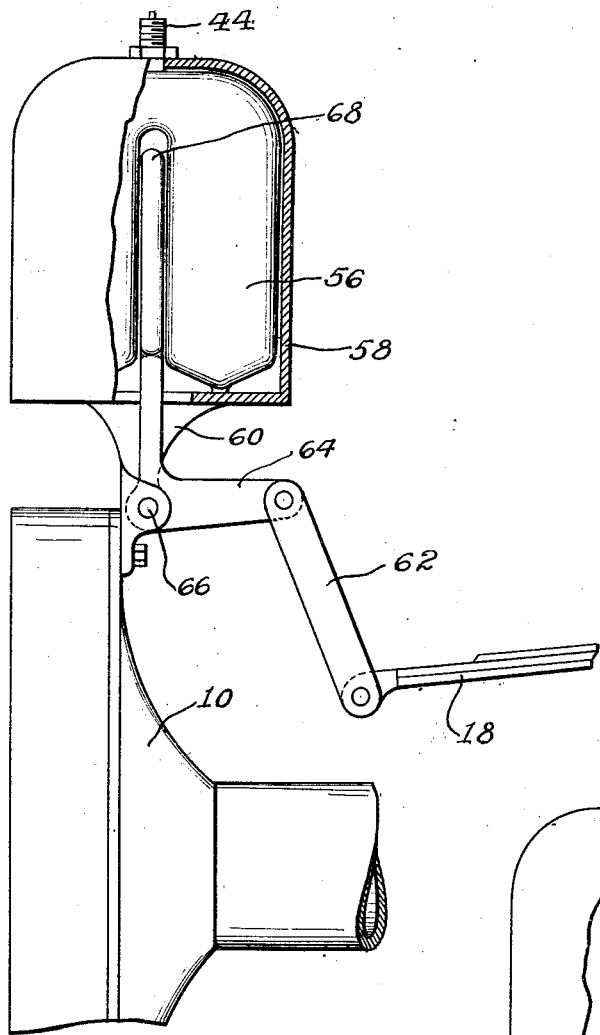
Figure 2:
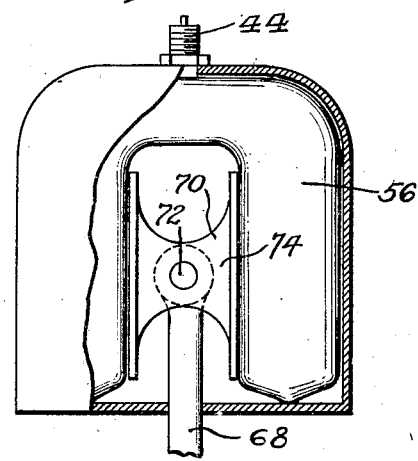

The various features of the invention are illustrated in the accompanying drawings, showing a form of embodiment which the invention is capable of assuming, in which;

Fig. 1 is an elevational view partly in section, of a shock absorber embodying one form of the invention as applied to a common type axle housing and spring mechanism; and Fig. 2 is a view partly in elevation of another form thereof.

In the present invention the shocks, rebounds, and side-thrusts are received from an axle housing of a motor vehicle directly on a pneumatic tube or cushion and absorbed or transmitted with reduced force or violence to the spring mechanism of the vehicle. The pneumatic cushion or tube may be of various forms and may be connected in the shock absorber in a number of different ways.

The pneumatic cushion or air spring may preferably be given a U shape or other form and may be mounted on the axle housing itself and relative motion between the axle houing and the spring mechanism may be transmitted to the pneumatic cushion by any suitable lever mechanism. It is preferred however, to have the cushion receive the jars both of direct shocks and rebounds, and for this purpose the annular or U shaped cushion will in general be found most satisfactory.

The elasticity or resiliency of the cushion may be adjusted for various conditions by the admission or withdrawal of air through a valve of the type commonly used on tires for this purpose.

Referring more particularly to the accompanying drawings, in Figs. 1 and 2 a substantially U-shaped pneumatic cushion 56 is enclosed by and supported in a housing 58 mounted directly on the axle housing 10 of a vehicle by means of a bracket 60. The spring mechanism 18 is pivotally connected by means of a link 62 to one end of a bell crank lever 64 which is pivotally supported on the bracket 60 by means of a pin 66. The other end of the lever extends upwardly into the housing 58 and is provided with an extended pressure surface 68 which presses against one or the other of the inside surfaces of the inflated tube 56 as the hub 10 moves upwardly or downwardly in relation to the spring mechanism 18. Thus, as the axle housing 10 is given an upward direct thrust, the thrust is received partly by the spring mechanism 18 through the link or shackle 62 and partly by throwing the pressure arm 68 to the right against the cushion 56, while on rebound the pressure plate is thrown to the left against the compressed air or gas in the tube 56 to absorb or reduce the recoil.

The proportioning of the thrust of the wheel and axle housing between the direct connection and the resilient cushion 56 may be determined by the position of the pin 66, the relative lengths of the arms of the bell crank lever 64 and also the relation of the link 62 with the other parts. The resiliency or elasticity of the tube 56 may also be controlled by increasing or decreasing the pressure of air within the cushion by the introduction or removal of air through a valve 44 similar to those commonly employed on pneumatic tires. The tube or cushion 56 therefore acts to absorb or deaden the violence and force of thrusts received from the axle housing 10 and to relieve the strain imposed on the spring mechanism.

A slight modification of the cushion and pressure arm is shown in Fig. 2. In this case, the upper arm 68 of the bell crank, instead of being expanded into a flat pressure plate as in Fig. 1, is arranged by means of a boss 70 and pin 72 to be connected to the pressure member 74, each side of which presses evenly against the full length of the straight inside of the U-shaped cushion. A more uniform pressure against the cushion is thereby afforded. Moreover the movement of the pressing means is rectilinear in view of the pivot 72 which movement prevents friction as there is no tilting, rubbing or friction action present.

Having described the invention, what is claimed as new is:

1. In a shock absorber for vehicle spring suspensions, a U-shaped flexible air container, a compressing member therefor pivotally mounted on one of two relatively movable members in the spring suspension and having a plurality of arms, one arm connected with the other of said relatively movable members and another arm located between the opposite parts of said U-shaped container, movement in both directions being resisted by said container.

2. In a shock absorber for vehicle spring suspensions, a U-shaped flexible air container, a member pivotally mounted on one of two relatively movable parts in said vehicle spring suspension, said member having a plurality of arms, one of which is connected with the other of said relatively movable parts and the other of which is located between opposite parts of said U-shaped container, and a rectilinearly moving compressing element connected with said last mentioned arm and operated thereby for engagement with said air container.

3. In a shock absorber for vehicle spring suspensions, resilient cushioning movement resisting means having two parts intercommunicating, one for resisting movement in one direction and the other for resisting movement in the other direction, and a compressing member between two relatively movable members of said spring suspension and arranged to cooperate with said resilient cushioning parts to resist movement of said members in both directions.

4. In a shock absorber for vehicle spring suspensions, a U-shaped flexible compressed air container, a casing therefor, a compressing member therefor pivotally mounted on one of two relatively movable members in said vehicle spring suspension, said compressing member comprising a bell crank lever having a plurality of arms, one of which is connected with the other of said relatively movable members and the other arm located between the opposite parts of said U-shaped container, the movement of which in either direction is resisted by said compressed air in said container, and means to uniformly distribute the pressure between said last mentioned arm and air container.

5. In a shock absorber for vehicle spring suspensions, a bracket secured to one of two relatively movable members in the vehicle spring suspension, a casing carried by said bracket, an inverted vertically arranged U-shaped flexible compressed air cushioning member in said casing, a bell crank lever pivoted to said bracket having a free arm within said casing between the legs of said U-shaped member, and a link pivotally connected to the other arm of said bell crank and to the other of said relatively movable members.

6. In a shock absorber for vehicle spring suspensions, a bracket secured to one of two relatively movable members in the vehicle spring suspension, a casing carried by said bracket, an inverted vertically arranged U-shaped flexible compressed air cushioning member in said casing, a bell crank lever pivoted to said bracket having a free arm within said casing between the legs of said U-shaped member, a link pivotally connected to the other arm of said bell crank and to the other of said relatively movable members, and means on said free arm for uniformly distributing pressure to said cushioning means.

7. A shock absorber for vehicle spring suspensions, a U-shaped flexible air container, a compressing member pivotally mounted on an axle and having a plurality of arms, one arm connected with the spring of the vehicle and another arm located between the opposite parts of said U-shaped container.

8. A shock absorbing device for vehicles consisting of a casing, and a lever arm mounted on said vehicle and connected to said casing and to a relatively movable portion of the vehicle, and an interconnected resilient member interposed between the casing and arm on either side of the latter and adapted to be compressed upon movement of said arm in either direction, said resilient member being entirely enclosed by the casing to increase snubbing action.

9. A shock absorbing device for vehicles comprising an enclosing case and a lever arm connected respectively to the axle and to the two members of the spring of an automobile, and a resilient member interposed between said case and arm, said resilient member being a U shaped pneumatic tube with means for inflation thereof.

10. In a shock absorber for vehicle spring suspension, a casing secured to one of two relatively movable members in said vehicle spring suspension, a two part gas containing cushioning means in said casing, and a two arm lever pivoted to one of said relatively movable members, having one free arm extending within said casing, between said two part cushioning means, and the other arm pivoted with the other of said relatively movable members, said cushioning means being adapted to permit all of the gas contained therein to be compressed by movement of said arm in either direction.

11. In a shock absorber for vehicle spring suspension, a casing secured to one of two relatively movable members in said vehicle spring suspension; a two part gas containing cushioning means in said casing; a two arm lever pivoted to one of said relatively movable members, having one free arm extending within said casing between said two part cushioning means, and the other arm pivoted to the other of said relatively movable members; and means on said free arm for uniformly distributing pressure to said cushioning means, said cushioning means being adapted to be compressed upon movement of said free arm in either direction.

12. In a vehicle having relatively movable members, a casing positioned on one of said members, yieldable inter-connecting elements in said casing, a pivoted arm positioned between said inter-connecting elements, and lever mechanism connecting another of said vehicle members, and adapted to move said arm into compressing relationship with either of the yieldable elements, both of said elements being adapted to absorb the shock when either of said elements is compressed.

13. In a vehicle having relatively movable members, a casing positioned on one of said members, yieldable gas containing elements in said casing; a two arm pivoted lever having one arm positioned between two of the gas containing elements, and the other arm connected to another of said vehicle members, the relative movement of said vehicle members in either direction, being adapted to bring about compression of the gas in both of said yieldable elements, through said lever arms.

14. In a vehicle having relatively movable members, a casing positioned on one of said members, yieldable rubber and air containing elements positioned in said casing; a pivoted arm positioned between said elements of the casing; and lever mechanism connected to another of the vehicle members, the movement of said other vehicle member in either direction being adapted to cause compression of the air in all of said yieldable elements in said casing, through the operation of said lever means.

15. In a shock absorber; a casing attached to one of two relatively movable parts of an automobile; a substantially U-shaped pneumatic cushion in said casing; and a compression member communicating with the other of said movable parts and extending between the legs of said pneumatic cushion whereby said pneumatic cushion resists movement between said relatively movable parts.

16. In a vehicle having relatively movable members, a casing positioned on one of said members; a pair of yieldable gas containers in said casing; means to compress one of said containers when relative movement occurs between said members in one direction and the other of said containers when relative movement occurs between said members in the opposite direction; and means to equalize the pressure between said containers when either one is compressed.

17. A yielding non-metallic mechanical connection and support between parts of a vehicle, one of which parts is to be connected to and supported by the other part comprising interconnected inflatable cushion members carried with one part and closely engaging opposite sides of the other part to maintain said other part in a given plane.

In testimony whereof I affix my signature.

JOHN ALLEN HEANY.